US00RE36042E

United States Patent [19]

Landy et al.

[11] E Patent Number: Re. 36,042

[45] Reissued Date of Patent: Jan. 12, 1999

[54] SHELF STABLE FAST-CORE AQUEOUS COATING

[75] Inventors: Francis Joseph Landy, Jenkintown; Andrew Mercurio, Gwynedd Valley; Roy Wesley Flynn, Warrington, all of Pa.

[73] Assignee: Rohm and Haas Company, Philadelphia, Pa.

[21] Appl. No.: 850,708

[22] Filed: May 2, 1997

Related U.S. Patent Documents

Reissue of:

[64] Patent No.: 5,527,853
Issued: Jun. 18, 1996
Appl. No.: 340,461
Filed: Nov. 14, 1994

U.S. Applications:

[63] Continuation of Ser. No. 32,735, Mar. 15, 1993, abandoned, which is a continuation of Ser. No. 879,542, May 4, 1992, abandoned, which is a continuation of Ser. No. 383,944, Jul. 21, 1989, abandoned.

[51] Int. Cl.[6] ..... C08K 5/35

[52] U.S. Cl. ..... 524/521

[58] Field of Search ..... 524/521, 314

[56] References Cited

U.S. PATENT DOCUMENTS

| | | | |
|---|---|---|---|
| 3,671,472 | 6/1972 | McNamee et al. | 260/17 |
| 4,054,717 | 10/1977 | Gill et al. . | |
| 4,087,397 | 5/1978 | Martorano et al. | 524/522 |
| 4,119,600 | 10/1978 | Bakule et al. | 524/514 |
| 4,199,400 | 4/1980 | Bakule et al. | 524/514 |
| 4,255,310 | 3/1981 | Oppenlaender et al. | 524/109 |
| 4,571,415 | 2/1986 | Jordan, Jr. | 524/428 |

FOREIGN PATENT DOCUMENTS

| | | |
|---|---|---|
| 0 066 108 | 12/1982 | European Pat. Off. . |
| 882188 | 10/1992 | European Pat. Off. . |
| 59-053558A | 3/1984 | Japan . |

*Primary Examiner*—Jeffrey T. Smith
*Attorney, Agent, or Firm*—Sudhir G. Deshmukh

[57] ABSTRACT

A shelf-stable fast-cure aqueous coating is disclosed. The coating contains an anionically stabilized latex, a polyfunctional amine and a volatile base in an amount sufficient to deprotonate the conjugate acid of the amine.

27 Claims, No Drawings

SHELF STABLE FAST-CORE AQUEOUS COATING

Matter enclosed in heavy brackets [ ] appears in the original patent but forms no part of this reissue specification; matter printed in italics indicates the additions made by reissue.

This application is a continuation of U.S. application Ser. No. 08/032,735 filed Mar. 15, 1993, now abandoned which is a continuation, of application Ser. No. 879,542, filed May 4, 1992, now abandoned, which is a continuation, of application Ser. No. 383,944, filed Jul. 21, 1989, now abandoned.

BACKGROUND OF THE INVENTION

This invention relates to aqueous coatings, particularly aqueous road-marking paint that dries quickly after application.

Various attempts to produce an aqueous road-marking paint as a substitute for solvent-based road marking paints have been disclosed in the art. A significant problem has been that the aqueous paints do not dry quickly enough.

European Patent Application No. 200249 discloses applying an aqueous dispersion of polymer to the road and then contacting the composition with a water soluble salt to cause the coating to dry rapidly and resist washout by a rain shower five minutes after application. This disclosure would require spraying with two compositions which would require the use of extra equipment.

European Patent application 0 066 108 discloses an aqueous road marking composition in which the binder is a mixture of a pure acrylic resin, a carboxylated styrene/dibutyl fumarate copolymer and a polymeric, polyfunctional amine such as polypropylenimine. This application states that the disclosed compositions arc not storage stable beyond 48 hours after which more polyfunctional amine must be added to restore activity.

SUMMARY OF THE INVENTION

The present invention provides a coating composition that dries quickly, develops water resistance soon after application and retains reactivity after storage.

The aqueous coating composition contains anionically stabilized emulsion polymer having a Tg greater than about 0° C. an effective amount of polyfunctional amine and a volatile base in an amount effective to raise the pH of the composition to a point high enough for the polyfunctional amine to be essentially in a non-ionized state (deprolonation) thereby eliminating polyamine interaction with the anionically stabilized emulsion and anionic ingredients in the coating.

In one aspect the invention provides an aqueous road or pavement-marking paint. The aqueous road or pavement marking paint of the invention can be used to mark lines or symbols on roads, parking lots walkways. etc. of various compositions such as asphaltic, bituminous or concrete paving with or without aggregate filler or top-dressing. This aqueous road-marking paint dries quickly, to develop early resistance to washout and tire tread printing.

DETAILED DESCRIPTION OF THE INVENTION

The aqueous coating composition is made from:

(A) an anionically stabilized polymer latex;

(B) a soluble or dispersible, preferably a soluble, polymer produced from monomer units in which from about 20% to 100% by weight of the monomer units contain an amine group;

(C) a volatile base in an amount effective to raise the pH of the composition to a point high enough for the polyfunctional amine to be essentially in a non-ionized state (deprotonation) thereby eliminating polyamine interaction with the anionically stabilized emulsion and anionic ingredients in the coating. The volatile base must be volatile enough to be released under air dry conditions.

Anioinically Stabilized Polymer

The anionically stabilized emulsion polymer can be prepared by known procedures, which arc published in texts on the subject such as "Emulsion Polymerization: Theory and Practice" by D. C. Blackley published by Wiley in 1975 and "Emulsion Polymerization" by F. A. Bovey et al. published by Interscience Publishers in 1965. In general, the anionically stabilized latex polymer is a polymer or copolymer prepared from monomers such as methyl acrylate, ethyl acrylate, butyl acrylate, 2-ethylhexyl acrylate, decyl acryate, methyl methacrylate, ethyl methacrylate, butyl methacrylate, styrene, butadiene, ethylene, vinyl acetate, vinyl ester of "Versatic" acid (a tertiary monocarboxylic acid having $C_9$, $C_{10}$ and $C_{11}$ chain length, the vinyl ester is also known as "vinyl versatate"), vinyl chloride, vinyl pyridine, vinylidene chloride, acrylonitrile, chloroprene, acrylic acid, methacrylic acid, itaconic acid, maleic acid and fumaric acid. Polymers and copolymers of alpha-beta ethylenically unsaturated monomers and their esters, especially the acrylic and methacrylic esters, arc preferred and are preferably prepared by processes given in "Emulsion Polymerization of Acrylic Monomers: May, 1966" published by the Rohm and Haas Company, Philadelphia, Pa., incorporated herein by reference.

The negative charge on the dispersed latex particles is obtained in any of several ways, the most common being the use of anionic surfactants or dispersants as the stabilizer during the emulsion polymerization or added to the emulsion after polymerization. Nonionic surfactants may, of course, also be present in the latex during or after polymerization of these anionically stabilized latexes. Among the useful surfactants and dispersants arc the salts of fatty rosin and naphthenic acids, condensation products of napthalene sulfonic acid and formaldehyde of low molecular weight, carboxylic polymers and copolymers of the appropriate hydrophile-lipophile balance, higher alkyl sulfates, such as sodium lauryl sulfate, alkyl aryl sulfonates, such as dodecylbenzene sulfonate, sodium or potassium isopropylbenzene sulfonates or isopropylnaphthalene sulfonates; sulfosuccinates, such as sodium dioctylsulfosuccinate alkali metal higher alkyl sulfosuccinates, e.g. sodium octyl sulfosuccinate, sodium N-methyl-N-palmitoyltaurate, sodium olcyl isethionate, alkali metal salts of alkylarylpolyethoxycthanol sulfates or sulfonates, e.g. sodium t-octylphenoxy-polyethoxyethyl sulfate having 1 to 5 oxyethylene units, and the various other anionic surfactants and dispersants well-known in the art.

Another type of negatively-charged latex is that which is obtained as a result of including in the polymers small amounts of acidic groups, which may be in the salt form, such as an alkali metal or ammonium salt. Examples of such acidic groups are those derived from incorporated initiator fragments, maleic acid, vinyl sulfonic acid, crotonic acid, acrylic acid, methacrylic acid, iraconic acid, and the like.

The polymer must have a glass transition temperature (Tg) above 0° C. Polymers having a Tg below 0° C. are generally not useful since they are too soft, resulting in poor scrub resistance and accelerated dirt pickup. The invention may also be practiced using polymers of more complex morphology, such as core-shell particles. These complex polymer morphologies usually display multiple Tg's and may display a Tg value below 0 degrees C. as one of its multiple Tg's, however the average or effective Tg of the polymer must be above about 0 degrees C.

To prepare a storage stable composition of the amine-containing polymer and the anionically stabilized emulsion polymer, the amine-functional polymer is maintained essentially in a nonionic state by adding a sufficient amount of volatile base to raise the pH of the composition at or near the point at which substantially all the amine functional groups are in a nonionic state (deprotonation) and therefore do not interact with the anionically stabilized latex. A starting point estimate of the amount of volatile base required to reach this point can be calculated from the number of equivalents of base needed to neutralize all of the acid groups in the latex (i.e. acid groups from: copolymerized carboxylic-bearing monomer; surfactant; or initiator) and the conjugate acid of the amine base. If the amine is not sufficiently deprotonated, the emulsion will exhibit observeable signs of instability over time, such as viscosity increase and microscopically observeable "particle rafting", an early stage of aggregation/gellation. One equivalent of volatile base (based on latex acids and polyamine titers) is usually enough to yield a stable system although higher levels of volatile base (~3 to 4 equivalents) may be necessary for long term stability. Higher amounts of volatile base can be used without departing from the spirit of the invention although the "quick dry" properties of the coating may be reduced. If the equipment used in the process of manufacture presents opportunities for loss of the volatile base by evaporation at any stage from when the volatile base is added until after the product is packaged in a sealed container, the amount of volatile amine loaded to the production equipment should be increased to offset the loss.

After application, the volatile base evaporates thus lowering the pH of the composition. When the pH of the composition falls to a point where the protonation of the polyamine begins to occur, the polyamine becomes cationic. The quick dry is believed to be initiated by this conversion of the polyamine to a cationic polymer in the presence of the anionically stabilized emulsion polymer, although the exact mechanism that produces the quick-dry property has not been established.

Polyfunctional Amine

The compositions of this invention contain a polyfunctional amine, preferably a polymer containing from about 20% to 100%, and preferably at least 50% by weight of amine-containing monomer. Examples of the amine containing monomers include members of the following classes:

Amine Classes

1. Aminoalkyl vinyl ethers or sulfides wherein the alkyl groups may be straight-chain or branched-chain type and have from two to three carbon atoms and wherein the nitrogen atom may be a primary, secondary, or tertiary nitrogen atom (U.S. Pat. No. 2,879,178). In the latter instance, one of the remaining hydrogen atoms may be substituted by alkyl, hydroxyalkyl, or alkoxyalkyl groups, the alkyl components of which may have one to four carbon atoms, preferably one carbon atom only. Specific examples include:

beta-aminoethyl vinyl ether; beta-aminoethyl vinyl sulfide; N-monomethyl-beta-aminoethyl vinyl ether or sulfide; N-monoethyl- beta -aminoethyl vinyl ether or sulfide; N-monobutyl- beta -aminoethyl vinyl ether or sulfide; and N-monomethyl-3-aminopropyl vinyl ether or sulfide.

2. Acrylamide or acrylic esters, such as those of the formula II:

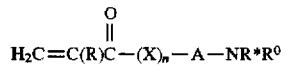

(II)

wherein

R is H or $CH_3$;

n is 0 or 1;

X is O or N(H);

When n is zero, A is $O(CH2)_x$ wherein x is 2 to 3, or $(O\text{-alkylene})_y$ wherein $(O\text{-alkylene})_y$ is a poly(oxyalkylene) group, having a molecular weight in the range from 88 to 348, in which the individual alkylene radicals are the same or different and are either ethylene or propylene; and when n is I, A is an alkylene group having two to 4 carbon atoms;

R* is H, methyl, or ethyl; and $R^1$ IS H, methyl, or ethyl; and $R^O$ is H, phenyl, benzyl, methylbenzyl, cyclohexyl, or $(C_1–C_6)$ alkyl.

Examples of compounds of formula II include:

dimethylaminoethylacrylate or methacrylate; beta -aminoethyl acrylate or methacrylate; N- beta-aminoethyl acrylamide or methacrylamide; N-(monomethylaminoethyl)-acrylamide or methacrylamide; N-(mono-n-butyl)-4-aminobutyl acrylate or methacrylate; methacryloxyethoxyethylamine; and acryloxypropoxypropoxypropylamine.

3. N-acryloxyalkyl-oxazolidines and N-acryloxyalkyltetrahydro-1,3-oxazines and the corresponding components in which the "alkyl" linkage is replaced by alkoxyalkyl and poly(alkoxy-alkyl), all of which are embraced by Formula III:

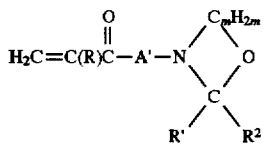

(III)

wherein

R is H or $CH_3$;

m is an integer having a value of 2 to 3;

R', when not directly joined to $R^2$, is selected from the group consisting of hydrogen, phenyl, benzyl, and $(C_1–C_{12})$ alkyl groups;

$R^2$, when not directly joined to R', is selected from the group consisting of hydrogen and $(C_1–C_4)$ alkyl groups; R' and $R^2$, when directly joined together, form a 5- to 6-carbon ring with the attached carbon atom of the ring in the formula, i.e., R' and $R^2$, when joined together, are selected from the group consisting of pentamethylene and tetramethylene; and A' is $O(C_mH_{2m})$— or $(O\text{-alkylene})_n$ in which $(O\text{-alkylene})_n$ is a poly(oxyalkylene) group, having a molecular weight in the range from 88 to 348, in which the individual alkylene radicals are the same or different and are either ethylene or propylene.

The compounds of Formula III can hydrolyze under various conditions to secondary amines. The hydrolysis produces products having the Formula IV:

$$H_2C{=}C(R)\overset{\overset{\displaystyle O}{\|}}{C}{-}A'{-}N(H){-}(C_mH_{2m}){-}OH \qquad (IV)$$

The compounds of Formula III are disclosed in U.S. Pat. Nos. 3,037,006 and 3,502,627 in the hands of a common assignee, and their corresponding foreign applications and patents and any of the monomeric compounds disclosed therein may be used in making the copolymers to be used in the composition of the present invention.

Examples of compounds of Formula III include:

oxazolidinylethyl methacrylate; oxazolidinylethyl acrylate; 3-(gamma-methacryl-oxypropyl)-tetrahydro- 1,3-oxazine; 3-(beta -methacryloxyethyl)-2,2-pentamethylene-oxazolidine; 3-(beta-methacryloxyethyl-2-methyl-2-propyloxazolidine; N-2-(2-acryloxyethoxy) ethyl-oxazolidine; N-2-(2-methacryloxyethoxy) ethyloxazolidine; N-2-(2-methacryloxyethoxy)ethyl-5-methyl-oxazolidine; N-2-(2-acryloxycthoxy)ethyl-5-methyl-oxazolidine; 3-[2-(2-methacryloxyethoxy) ethyl)]-2,2-penta-methylene-oxazolidine; 3-[2-(2-methacryloxyethoxy)ethyl)]-2,2-dimethyloxazolidine; 3-[2-(methacryloxyethoxy)ethyl]-2-phenyl-oxazolidine.

4. Polymers of monomers which readily generate amines by hydrolysis are useful as the amine;containing component or to generate the amine-containing component polymer of this binder composition. Examples of such monomers are acryloxy-ketimines and -aldimines, such as those of Formulas V and VI following:

$$H_2C{=}(CR){-}COOA''N{=}Q \qquad (V)$$

$$H_2C{=}C(R){-}CO{-}(D)_{n''-1}{-}(B)_{n'-1}{-}(A^o)_{n^o-1}{-}N{=}Q \qquad (VI)$$

wherein

R is H or $CH_3$;

Q is selected from the group consisting of

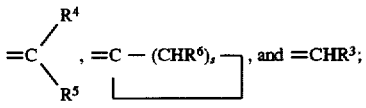

$R^6$ is H or it may be methyl in one $CHR^6$ unit;

$R^5$ is selected from the group consisting of $(C_1{-}C_{12})$-alkyl and cyclohexyl groups;

$R^4$ is selected from the group consisting of $(C_1{-}C_{12})$-alkyl and cyclohexyl $R^3$ is selected from the group consisting of phenyl, halophenyl.

$(C_1{-}C_{12})$-alkyl, cyclohexyl, and $(C_1{-}C_{14})$ alkoxyphenyl groups;

A" is a $(C_1{-}C_{12})$ alkylene group;

$A^o$, B and D arc the same or different oxyalkylene groups having the formula $-OCH(R^7)-CH(R^7)-$wherein $R^7$ is H, $CH_3$, or $C_2H_5$;

x is an integer having a value of 4 to 5;

$n^o$ is an integer having a value of 1 to 200;

n' is an integer having a value of 1 to 200; and n" is an integer having a value of 1 to 200, the sum of $n^o-1$, $n'-1$ and $n''-1$ having a value of 2 to 200.

Illustrative compounds of formulas V and VI are:

2-[4-(2,6-dimethylheptylidene)-amino]-ethyl methacrylate

3-[2-(4-methylpentylidine)-amino]-propyl methacrylate beta-(benzylideneamino)-ethyl methacrylate 3-[2-(4-methylpentylidine)-amino]-ethyl methacrylate 2-[4-(2,6-dimethylheptylidene)-amino]-ethyl acrylate 12-(cyclopentylidene-amino)-dodecyl methacrylate N-(1,3-dimethylbutylidene)-2-(2-methacryloxyethoxy)-ethylamine N-(benzylidene)-methacryloxyethoxyethylamine N-(1,3-dimethylbutylidene)-2-(2-acryloxyethoxy)-ethylamine N-(benzylidene)-2-(2-acryloxyethoxy)ethylamine The compounds of Formulas V and VI hydrolyze in acid, neutral, or alkaline aqueous media to produce the corresponding primary amines or salts thereof in which the group —N=Q of the formulas becomes $-NH_2$ and O=Q. The compounds of Formulas V and VI are disclosed in U.S. Pat. Nos. 3,037,969 and 3,497,485, and any of the monomeric compounds therein disclosed may be used in the making of the copolymers to be used in the water-soluble polymer portion of the compositions of the present invention.

Description of Polymer Solubility

Water-soluble amine-containing polymers include both the completely soluble and the partly soluble polymers. The term water-soluble amine-containing polymer describes polymer that is completely soluble either in free-base, neutral, or salt form. Some polymers are soluble at all pH's, while others are soluble over a range of pH for example from about 5 to 10. Other amine-containing polymers are generally insoluble at high pH and soluble or partly soluble at acidic pH values, particularly in the pH range from about 5 to about 7. By partly soluble is meant both the situation in which some of the polymer is soluble in water as well as that in which the entire polymer dissolves in the form of micelles or aggregates of individual molecules, generally, highly water swollen aggregates. The latter are often called colloidal solutions. It is preferred that most of the polymer be soluble at the acidic pH values.

Amine Polymer Preparation

In general, the amine-containing polymers may be obtained by solution polymerization in aqueous media, either neutral, alkaline, or acidic, depending upon the particular polymer sought, as generally known in the art, for example as taught in U.S. Pat. No. 4,119,600. Generally, the polymerization is carried out in an aqueous medium containing a small amount of an acid, either organic or inorganic, such as acetic acid or hydrochloric acid. The amine-containing polymers include copolymers with up to 80% by weight one or more monoethylenically unsaturated monomers, such as methyl acrylate, acrylamide and methacrylamide. Small amounts of relatively insoluble comonomers may also be used to obtain the water-soluble polymers. The insoluble polymers may contain larger amounts of these comonomers. Such monomers include, as examples, acrylic acid esters with (C1 to C18) alcohols and methacrylic acid esters with alcohols having one to 18 carbon atoms, especially (C1–C4) alkanols; styrene, vinyltoluene, vinyl acetate, vinyl chloride, vinylidene chloride, substituted styrenes, butadiene, substituted butadienes, ethylene; and the nitrites and amides of acrylic or of methacrylic acid. The particular comonomer or comonomers used in making a given amine-containing polymer depends upon the proportion of amine-containing monomer used in making the copolymer. The polymers arc thus polymers or copolymers of cationic and, optionally, nonionic vinyl monomers. Examples of the cationic monomers are the amines and imines; the other recited monomers arc nonionic. Thus, these water-soluble copolymers contain no acid groups other than trace amounts which may be present due to impurities in the monomers used or to small extent of hydrolysis during synthesis, storage or use.

Volatile Base

The type and amount of volatile base used must be sufficient to raise the pH of the composition to about the point where the polyfunctional amine is non-ionized (deprotonated), to avoid interaction with the anionically stabilized emulsion. The volatile base of preference is ammonia, which may be used as the sole volatile base or in admixture with other volatile or nonvolatile bases. Other volatile bases which may be employed are morpholine, the lower alkyl amines, 2-dimethylaminoethanol, N-methylmorpholine, ethylenediamine, and others.

Filler, extenders, pigments and other additives known in the art may also be used in the compositions of the invention. If pigment is used in the traffic paint composition, it is typically in the range of fifty percent pigment volume content to sixty percent pigment volume content. Examples of pigments that may be employed include clays, calcium carbonate, talc, titanium dioxide, carbon black, and various colored pigments.

Care must be exercised when selecting the type and amount of additives to avoid altering the pH of the composition to an extent that interferes with storage stability or buffering the pH to an extent that after application the pH does not fall sufficiently to initiate protonation of the polyamine. For example a paint prepared using a polyamine with a relatively low pKa and too large an amount of calcium carbonate as filler, may display an unacceptably extended cure time.

Traffic paint compositions typically have a solids content in the range of from thirty five% to seventy% by volume and a viscosity of from about 70 kreb units to about 100 kreb units. Coatings provided by the invention are also useful in other exterior coatings such as maintenance coatings, house paint, etc..

The following examples illustrate some aspects of the invention and should not be construed as limiting the scope of the invention which is described in the specification and claims.

Abbreviations:

AM=Acrylamide
DMAEMA=Dimethylaminoethylmethacrylate
DMAPMA=Dimethylaminopropylmethacrylamide
HEMA=Hydroxyethylmethacrylate
MMA=Methylmethacrylate
OXEMA=Oxazolidinoethylmethacrylate
p-OXEMA=poly-oxazolidinoethylmethacrylate

Paint Preparation

The test paints were prepared according to the following standard paint formulation by grinding together the ingredients listed as grind ingredients below and then adding the remaining ingredients in the letdown. The emulsion was an anionic copolymer of butyl acrylate, methyl methacrylate and methacrylic acid having a $T_g$ of 20° C., and a particle size of 200 nanometers.

| Grind ingredient | Amount (lb/103 gals) |
|---|---|
| Emulsion (50% solids) | 457.9 |
| Water | 28.4 |
| Tamol 850 | 7.1 |
| Triton CF-10 | 2.8 |
| Drew L-493 | 1.0 |
| TiPure R900 | 100.0 |
| Silverbond B | 156.3 |
| Snowflake-(calcium carbonate) | 595.9 |
| LetDown | |
| Texanol | 22.9 |
| Methanol | 15.0 |
| Drew L-493 | 2.0 |
| Hydroxyethyl cellulose 250 MR | 15.0 |
| (2.5% solotion in water) | |
| | 1,403.3 |

DESCRIPTION OF TEST METHODS

Dry Time Test

This test is similar to ASTM D1640 which is a standard test for drying of organic coatings at room temperature. The test films are applied on a non-porous substrate (glass plate or metal panel) by suitable means to give a wet film thickness of 0.012+/−0.001 inches. The ASTM test method is modified in that only minimal thumb pressure is used. The thumb is turned through an angle of 90° while in contact with the film. The drying time at which this rotation does not break the film is recorded.

Early Washout Resistance

The test films are prepared in the same manner as for the dry time test. After the films have dried for 15 minutes at a temperature of 78° F and 50% relative humidity, the samples were held under a stream of cold running water (tap pressure of 170–200 gallons per hour), which contacted the surface of the paint film at from a nearly perpendicular to an oblique angle. The samples remained under the stream of running water for a period of five (5) minutes. At the end of this period the samples were removed from the test stream and rated by visual inspection. Samples that showed no apparent effect were rated passes; those that exhibited slight disruption of the film were rated marginal; those samples that showed a break in the film or any film removal were rated as fails.

Scrub Resistance

Films of 3.5 mils dry thickness were prepared and cured for 24 hours at 77° F. +/−2° F. and 40–55% relative humidity. The films were tested according to according to ASTM D2486. The number of scrub cycles at which to an area of the paint film was fully removed was recorded.

Heat Aging Test

One pint of the test paint was placed in a sealed can and stored in a sealed circulation oven at 120° F. for one week. The can was removed from the oven and the paint was observed. If the paint is still fluid and shows no apparent signs of bodying or separation it is rated as a pass.

EXAMPLES

Comparative Example A—Addition of Polyamine to Anionic Polymer Latex Produces Paint That Is Not Storage Stable To a paint formulation prepared according to the formulation described above, 10 lbs. of polyOXEMA (28.5% solids) was added. The consistency of this paint changed from a fluid mixture to a solidified mass on aging 16 hours at ambient temperature.

Example 1—Addition of Volatile Base Produces Paint That Is Storage Stable

The procedure of the Comparative Example was repeated except that 3.9 lbs. of ammonium hydroxide (28%) was added before the polyOXEMA. The paint remained fluid when stored at room temperature and passed the heat aging test.

Example 2—Various Levels of Polyamine

Test paints were prepared by adding polyamine (polyOXEMA), as in Example 1, in the amount indicated in the table as a percent by weight based on vehicle solids. The paints were applied to substrates and tested. The standard paint without any amine-containing polymer was used as a control. The results appear in the table below:

| Level of Polyamine (% solids on vehicle solids) | Easy Washout Resistance | Scrub Resistance Properties |
|---|---|---|
| Control | fail | 950 cycle |
| 0.27% p.OXEMA | marginal | — |
| 0.62% p.OXEMA | passes | 760 cycles |
| 1.25% p.OXEMA | passes | 950 cycles |
| 2.5% p.OXEMA | passes | 910 cycles |

The above data demonstrates that the amine-functional polymer produces early washout resistance with acceptable scrub resistance properties. Also, the paint containing 1.25% polyOXEMA dried in 10 minutes in the dry time test compared to 20 minutes dry time for the Control paint that doesn't contain polyamine.

Example 3—Use of Polymers and Copolymers of Various Amine-containing Monomers Demonstrated Paints were prepared using the indicated amine-containing polymer according to the procedure of Example 1. The paint without any amine-containing polymer was used as a control. Samples were prepared by adding amine-containing polymer to the standard formulation in the amount indicated in the table measured as a percent by weight based on vehicle solids. The sample emulsions were applied to substrates and tested. The results appear in the table below:

| Type of Polyamine in marking point Formulation (1.25% S/S) | Early Washout Resistance | 7 days aging 120° F. |
|---|---|---|
| none | fail | passes |
| pOXEMA | passes | passes |
| OXEMA/HEMA 50/50 | passes | passes |
| OXEMA/MMA 70/30 | passes | passes |
| DMAPMA/AM 70/30 | passes | passes |
| DMAPMA/HEMA 70/30 (0.44% s/s) | passes | passes |
| pDMAEMA | passes | passes |

The above data demonstrates that marking paints according to the invention have early washout resistance and were storage stable even under storage at elevated temperature.

We claim:

1. A shelf-stable fast-cure aqueous coating composition consisting essentially of:

(a) an anionically stabilized emulsion polymer having a Tg greater than about 0° C.;

(b) a water soluble polyfunctional amine polymer having from about 20% to about 100% of the monomer units by weight containing an amine group and having no acid groups other than trace amounts; and (c) an amount of volatile base sufficient to raise the pH of the composition to a point where essentially all of the polyfunctional amine is in a non-ionic state, *a test film of said composition having a dry time of 10 minutes as determined under a modified ASTM D1640 dry test.*

2. The composition of claim 1 wherein the amount of polyfunctional amine is from about 0.25 to about 10 parts per 100 parts emulsion solids by weight.

3. The composition of claim 2 wherein the amount of polyfunctional amine is from about 0.4 to about 5 parts per 100 parts emulsion solids by weight.

4. The composition of claim 3 wherein the amount of polyfunctional amine is from about 0.6 to about 2.5 parts per 100 parts emulsion solids by weight.

5. The coming composition of claim 1 wherein the polyfunctional amine is polyoxazolidinoethylmethacrylate.

6. The coating composition of claim 1 wherein the polyfunctional amine polymer contains dimethylaminopropylmethacrylamide.

7. The coming composition of claim 1 wherein the polyfunctional amine polymer contains oxazolidinoethylmethacrylate.

8. The coating composition of claim 1 wherein the polyfunctional amine polymer contains dimethylaminoethylmethacrylate.

9. A shelf stable fast-cure aqueous traffic paint consisting essentially of:

(a) an anionically stabilized emulsion polymer having a Tg greater than about 0° C.;

(b) a water soluble polyfunctional amine polymer; and (c) an amount of volatile base sufficient to raise the pH of the composition to a point where essentially all of the polyfunctional amine is in a non-ionic state, *a test film of said composition having a dry time of 10 minutes as determined under a modified ASTM D1640 dry test.*

10. A shelf stable fast-cure aqueous paint composition consisting essentially of:

(a) an anionically stabilized emulsion polymer having a Tg greater than about 0° C.;

(b) a water soluble polyfunctional amine; and (c) an amount of a volatile base sufficient to raise the pH of the composition to a point where essentially all of said polyfunctional amine is in a non-ionic state, *a test film of said composition having a dry time of 10 minutes as determined under a modified ASTM D1640 dry test.*

11. The composition of claim 10 wherein said polyfunctional amine is polymerized from 20% to 100% by weight of amine containing monomer units.

12. The composition of claim 11 wherein said monomer units are selected from the group consisting of dimethylaminopropylmethacrylamide, oxazolidinoethylmethacrylate and dimethylaminoethylmethacrylate.

13. An exterior shelf-stable fast-cure aqueous paint composition consisting essentially of:

(a) an anionically stabilized emulsion polymer having a Tg greater than about 0° C.;

(b) 0.6 to 2.5 parts per 100 parts of emulsion solids by weight of a water soluble polyfunctional amine polymer having no acid groups other than trace amounts and polymerized from oxazolidinoethylmethacrylate monomer units; and (c) an amount of a volatile base sufficient to raise the pH of the composition to a point where essentially all of said polyfunctional amine is in a non-ionic state, *a test film of said composition having a dry time of 10 minutes as determined under a modified ASTM D1640 dry test.*

14. A shelf stable fast-cure aqueous traffic paint composition consisting essentially of:

(a) an anionically stabilized emulsion polymer having a Tg greater than about 0° C.;

(b) a water soluble polyfunctional amine; and (c) an amount of a volatile base sufficient to raise the pH of the composition to a point where essentially all of said polyfunctional amine is in a non-ionic state, *a test film of said composition having a dry time of 10 minutes as determined under a modified ASTM D1640 dry test.*

15. The composition of claim 14 wherein said polyfunctional amine is polymerized from 20% to 100% by weight of amine containing monomer units.

16. The composition of claim 15 wherein said monomer units arc selected from the group consisting of dimethylaminopropylmethacrylamide, oxazolidinoethylmethacrylate and dimethylaminoethylmethacrylate.

17. An exterior shelf-stable fast-cure aqueous traffic paint composition consisting essentially of:

(a) an anionically stabilized emulsion polymer having a Tg greater than about 0° C.;

(b) 0.6 to 2.5 parts per 100 parts of emulsion solids by weight of a water soluble polyfunctional amine polymer polymerized from oxazolidinoethylmethacrylate monomer units; and (c) an amount of a volatile base sufficient to raise the pH of the composition to a point where essentially all of said polyfunctional amine is in a non-ionic state, *a test film of said composition having a dry time of 10 minutes as determined under a modified ASTM D1640 dry test.*

18. The composition of claim 17 wherein said emulsion polymer has a Tg of 20° C.

19. The composition of claim 17 wherein the amount of said polyfunctional amine is 1.25 parts per 100 parts of emulsion solids.

*20. The traffic paint of claim 9 wherein the polyfunctional amine polymer is polymerized from monomer units containing an amine or imine group.*

*21. The composition of claim 10 wherein the polyfunctional amine is polymerized from monomer units containing an amine or imine group.*

*22. The composition of claim 13 wherein the polyfunctional amine polymer is polymerized from monomer units containing an amine or imine group.*

*23. The composition of claim 14 wherein the polyfunctional amine is polymerized from monomer units containing an amine or imine group.*

*24. A shelf stable fast cure aqueous composition consisting essentially of:*

*(a) an anionically stabilized emulsion polymer having a Tg greater than about 0° C.;*

*(b) a water soluble polyfunctional amine polymer having from about 20 percent to about 100 percent of the monomer units by weight containing an amine or imine group; and*

*(c) an amount of volatile base sufficient to raise the pH of the composition to a point where essentially all of the polyfunctional amine polymer is in a non-ionic state a test film of said composition having a dry time of 10 minutes as determined under a modified ASTM D1640 dry test.*

*25. A shelf stable fast cure aqueous traffic paint consisting essentially of:*

*(a) an anionically stabilized emulsion polymer having a Tg greater than about 0° C.;*

*(b) a water soluble polyfunctional amine polymer having from about 20 percent to about 100 percent of the monomer units by weight containing an amine or imine group; and*

*(c) an amount of volatile base sufficient to raise the pH of the composition to a point where essentially all of the polyfunctional amine polymer is in a non-ionic state, a test film of said composition having a dry time of 10 minutes as determined under a modified ASTM D1640 dry test.*

*26. A shelf stable fast cure aqueous composition consisting essentially of:*

*(a)an anionically stabilized emulsion polymer having a Tg greater than about 0° C.;*

*(b) a water soluble polyfunctional amine polymer polymerized from monomer units containing an imine group; and*

*(c) an amount of volatile base sufficient to raise the pH of the composition to a point where essentially all of the polyfunctional amine polymer is in a non-ionic state.*

*27. A shelf stable fast cure aqueous traffic paint consisting essentially of:*

*(a) an anionically stabilized emulsion polymer having a Tg greater than about 0° C.;*

*(b) a water soluble polyfunctional amine polymer polymerized from monomer units containing an imine group; and*

*(c) an amount of volatile base sufficient to raise the pH of the composition to a point where essentially all of the polyfunctional amine polymer is in a non-ionic state.*

* * * * *